Aug. 27, 1968 HISASHI FUNAZUKA 3,399,392

MAGNETIC TRANSDUCER POSITIONING APPARATUS

Filed Sept. 24, 1964 2 Sheets-Sheet 1

Aug. 27, 1968 HISASHI FUNAZUKA 3,399,392

MAGNETIC TRANSDUCER POSITIONING APPARATUS

Filed Sept. 24, 1964 2 Sheets-Sheet 2

United States Patent Office 3,399,392

Patented Aug. 27, 1968

3,399,392

MAGNETIC TRANSDUCER POSITIONING APPARATUS

Hisashi Funazuka, Kawasaki, Japan, assignor to Fujitsu Limited, Kawasaki, Japan, a corporation of Japan Filed Sept. 24, 1964, Ser. No. 398,934
5 Claims. (Cl. 340—174.1)

ABSTRACT OF THE DISCLOSURE

A first positioning device is coupled to one end of a first connecting rod and is movable in $n$ possible positions each entailing a unit increment of movement $l$. A second positioning device is coupled to one end of a second connecting rod and is movable in $m$ possible positions each entailing a unit increment of movement $bl/am$. The first connecting rod has another end pivotally affixed by a first pivot pin to one end of a link and the second connecting rod has another end pivotally affixed by a second pivot pin to the other end of the link. The distance between the second and third pivot pins is $b$ and the distance between the first and third pivot pins is $a$. A lever is pivotally affixed at one end by a third pivot pin to an intermediate point of the link and is coupled at its other end to one end of a head arm which supports magnetic transducer heads, so that the heads are movable to $nm$ positions each entailing an increment of movement of $bl/a+b$.

My invention relates to a magnetic transducer positioning apparatus and, more particularly, to an apparatus for positioning a plurality of magnetic transducer heads on a plurality of magnetic signal storage discs.

In electronic computers, magnetic discs are often used as data storage devices. The magnetic disc storage device comprises a plurality of magnetic discs which rotate at high speed and a plurality of magnetic transducer heads positioned in operative proximity with the surface of each disc. Provided on the surface of each of the magnetic discs are a plurality of tracks for recording or read-out of information transferred to or from the tracks by the magnetic heads. If one of the tracks is to be selected by a head to record or read out information, magnetic head supports are required so that the heads may be positioned at the proper place on each track of the disc. In fact, in this type of storage device it is required that the magnetic heads be positionable at several hundred different places relative to the tracks of each disc.

The present invention relates to a magnetic head positioning arrangement which may be employed in the aforementioned magnetic disc memory storage, and the purpose of the present invention is to provide a magnetic head positioning arrangement by which magnetic heads may be positioned exactly as desired.

The principal object of the present invention is to provide a new and improved magnetic transducer head positioning apparatus capable of positioning a plurality of such heads on a plurality of magnetic discs simultaneously.

Another object of the present invention is to provide a magnetic transducer head positioning arrangement which is efficient and effective in operation.

Still another object of the present invention is to provide a magnetic head positioning arrangement which is sturdy and reliable.

In order that the present invention may be readily carried into effect, it will now be described with reference to the accompanying drawings, wherein.

In the figures, the same components are indicated by the same reference numerals.

Figure 1:
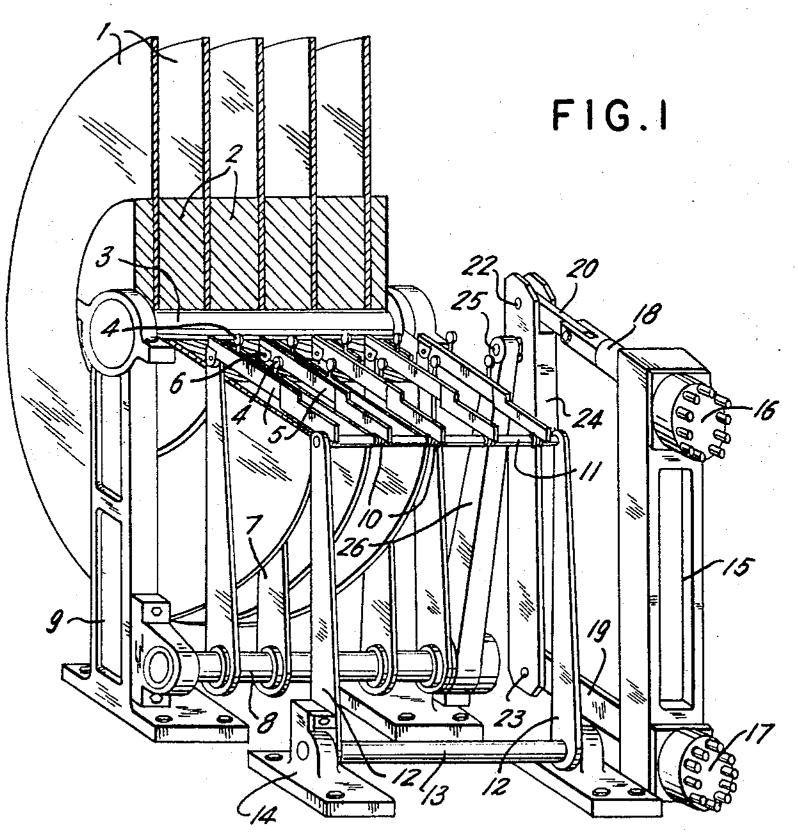
FIG. 1 is a cutaway perspective view, partly in section, of an embodiment of the magnetic head positioning arrangement of the present invention.

In FIG. 1, a plurality of magnetic discs 1, in spaced relation to each other, having spacers 2 positioned between adjacent discs, are mounted for rotation with a shaft 3. The discs 1 are parallel to each other and are affixed to the shaft 3. The discs 1 are rotated at high speed with the shaft 3 by a motor, which is not shown in the figures. Magnetic heads 4 are arranged close to the surface of each magnetic disc in operative proximity to each disc along the radius of each disc. The heads 4 record or read out information on the discs 1.

The heads 4 corresponding to each of the discs 1 are mounted on a head arm 5 corresponding to each disc. Thus, the heads 4 corresponding to the first disc 1 are mounted on a first head arm 5 and are positioned in operative proximity with the storage surface of the first disc, the heads 4 corresponding to the second disc 1 are mounted on a second head arm 5 and are positioned in operative proximity with the storage surface of the second disc, and so on.

Each head arm 5 is in the shape of a bar. One end of each head arm 5 is pivotally coupled to a corresponding lever 7 by a pivot pin 6. The levers 7 are thus each pivotally coupled at one end to a corresponding head arm 5. Each lever 7 is mounted at its other end on a shaft 8 for rotation with the shaft 8. The shaft 8 is rotatably supported for rotation or angular displacement about its axis by a frame 9 which also supports the shaft 3 for rotation about its axis.

The other end of each head arm 5 rests in a corresponding one of a plurality of guide grooves 10. The guide grooves 10 are formed in a shaft 11 or are formed in guide rings mounted on the shaft 11. The shaft 11 is supported by a frame 14 by means of supports 12 which are spaced by a member 13. The supports 12 are fixedly mounted and remain fixed in position.

A frame 15 supports a positioning device 16 and a positioning device 17. Each positioning device 16 and 17 may comprise any suitable arrangement for moving connecting rods 18 and 19, respectively, backward and forward with reference to the plane formed by the supports 12 and the member 13. The connecting rod 18 is coupled to the positioning device 16 and is moved backward and forward by said positioning device. The connecting rod 19 is coupled to the positioning device 17 and is moved backward and forward by said positioning device. Each of the positioning devices 16 and 17 may comprise a hydraulic positioning device of any suitable type. A hydraulic positioning device of suitable type is that described in copending patent application Ser. No. 379,795 filed on July 2, 1964 by Kota Asano and now abandoned.

The connecting rods 18 and 19 are connected to both ends of a link 24 via a lever 20 and pivot pins 22 and 23, respectively. A lever 26 is pivotally coupled at one end to the link 24 by a pivot pin 25 and is mounted at its other end on the shaft 8 in a manner similar to the mounting of the levers 7 on the shaft 8.

Figure 2:
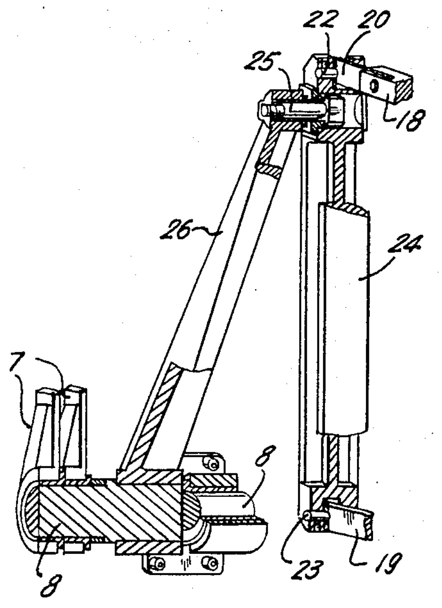
FIG. 2 is a cutaway perspective view, partly in section, of a part of the embodiment of FIG. 1.

FIG. 2 illustrates the coupling of the link 24, the lever 26 and the shaft 8. The pivot pin 25 is affixed to the link 24 in a manner which permits shifting of said pivot pin up and down to a certain extent.

Figure 3:
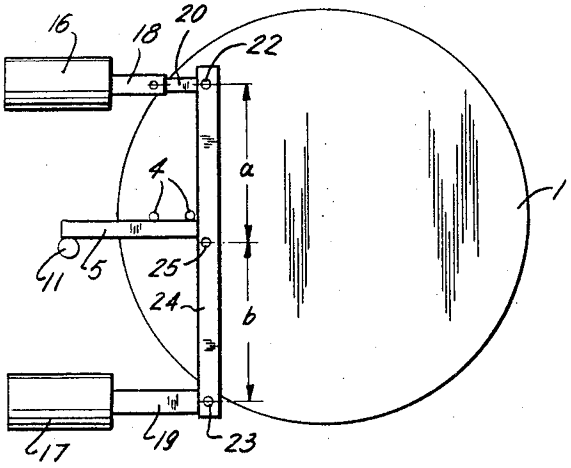
FIG. 3 is a side view of a part of the embodiment of FIG. 1.
Figure 4:
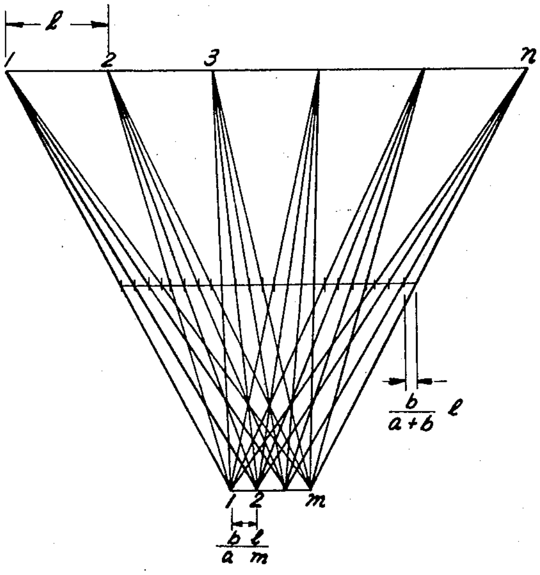
FIG. 4 is a graphical illustration of the number of positions which may be assumed by the head positioning arrangement of the present invention.

FIGS. 3 and 4 aid in describing the operation of the magnetic head positioning arrangement of the present invention.

FIG. 4 illustrates the number of positions attainable by the head positioning arrangement of the present invention. In FIG. 3, $a$ is the distance or space between the pivot pin 22 and the pivot pin 25 and $b$ is the distance or the space between the pivot pin 23 and the pivot pin 25. The positioning device 16 may be positioned in $n$ possible positions each entailing a unit increment of movement $l$ and the positioning device 17 may be positioned in $m$ possible positions each entailing an increment of movement $bl/am$. The pivot pin 25 may thus be positioned in $n$ times $m$ or $nm$ possible positions each entailing an increment of movement $bl/a+b$. In FIG. 4, the numbers 1, 2, 3, $n$ and 1, 2, $m$ indicate positions of components such as the positioning devices 16 and 17.

Since the shift of the pivot pin 25 is transmitted to the magnetic heads 4 via the lever 26, the shaft 8, the lever 7 and the head arm 5, the magnetic heads may each be positioned in $nm$ different positions. If the increment of movement of the positioning devices 16 and 17 is a unit and is the same, and if there are to be 100 head positions, $n=m=10$ and $a:b=1.10$.

The magnetic transducer heads 4 of the apparatus are positionally controlled by selection of the desired head position in the positioning devices 16 and 17. The positioning devices 16 and 17 then function to move their corresponding connecting rods 18 and 19 a number of increments corresponding to the desired position of the heads backward from the plane formed by the supports 12 and the member 13, or forward from the plane formed by the supports 12 and the member 13. The connecting rods 18 and 19 and the lever 20 of the connecting rod 18 move the link 24 backward or forward a distance determined in accordance with the number of increments of movement of the positioning devices 16 and 17.

If the link 24 is moved backward, it moves the pivot pin 25 backward with it, thereby angularly displacing the lever 26 counterclockwise about the axis of the shaft 8 and angularly displacing said shaft counterclockwise about its axis, since the lever 26 is secured to said shaft for rotation therewith. Angular displacement of the shaft 8 in a counterclockwise direction about its axis causes angular displacement of the levers 7 in a counterclockwise direction about the axis of said shaft, since the levers 7 are secured to said shaft for rotation therewith. The displacement of the levers 7 in a counterclockwise direction causes the head arms 5 to move backward from the plane of the supports 12 and member 13, thereby positioning the heads 4 mounted on said head arms in relation to the discs 1.

If the link 24 is moved forward, it moves the pivot pin 25 forward with it thereby angularly displacing the lever 26 clockwise about the axis of the shaft 8 and angularly displacing said shaft clockwise about its axis. Angular displacement of the shaft 8 in a clockwise direction about its axis causes angular displacement of the levers 7 in a clockwise direction about the axis of said shaft. The displacement of the levers 7 in a clockwise direction causes the head arms 5 to move forward from the plane of the supports 12 and member 13, thereby positioning the heads 4 mounted on said head arms in relation to the discs 1.

While the invention has been described by means of a specific example and in a specific embodiment, I do not wish to be limited thereto, for obvious modifications will occur to those skilled in the art without departing from the spirit and scope of the invention.

I claim:

1. A magnetic transducer head positioning device in a magnetic disc memory, said head positioning device comprising

- a magnettic signal storage disc having a storage surface;
- a head arm movably mounted at one end;
- a magnetic transducer head supported by said head arm in operative proximity with the storage surface of said disc for transferring data to and from said storage surface;
- a fixed shaft guiding the other end of said head arm;
- a link having two ends;
- a first connecting rod having one end pivotally affixed by a first pivot pin to one end of said link;
- a first positioning device coupled to the other end of said first connecting rod and movable in $n$ possible positions each entailing a unit increment of movement $l$;
- a second connecting rod having one end pivotally affixed by a second pivot pin to the other end of said link;
- a lever pivotally affixed at one end by a third pivot pin to an intermediate point of said link and coupled at its other end to the one end of said head arm; and
- a second positioning device coupled to the other end of said second connecting rod and movable in $m$ possible positions each entailing a unit increment of movement $bl/am$, wherein $b$ is the distance between said second and third pivot pins and $a$ is the distance between said first and third pivot pins whereby said head is movable, to $nm$ positions each entailing an increment of movement of $bl/a+b$.

2. A magnetic transducer head positioning device as claimed in claim 1, wherein said head arm supports a plurality of magnetic transducer heads in operative proximity with the storage surface of said disc.

3. A magnetic transducer head positioning device as claimed in claim 1, wherein each of said first and second positioning devices is a hydraulic device.

4. A magnetic transducer head positioning device as claimed in claim 1, wherein a plurality of magnetic signal storage discs each having a storage surface are spaced from each other, a plurality of head arms are movably mounted each at one end and each of said head arms supports a plurality of magnetic transducer heads in operative proximity with the storage surface of a corresponding one of said discs.

5. A magnetic transducer head positioning device as claimed in claim 4, wherein said discs are positioned in parallel relation at equal distances from each other.

References Cited

UNITED STATES PATENTS

| | | | |
|---|---|---|---|
| Re. 25,719 | 1/1965 | Johnson et al. | 340—174.1 |
| 2,825,237 | 3/1958 | Keehn et al. | 74—479 |
| 3,124,789 | 3/1964 | Wasylenko | 340—174.1 |

BERNARD KONICK, *Primary Examiner.*

B. HALEY, *Assistant Examiner.*